Figure 1:
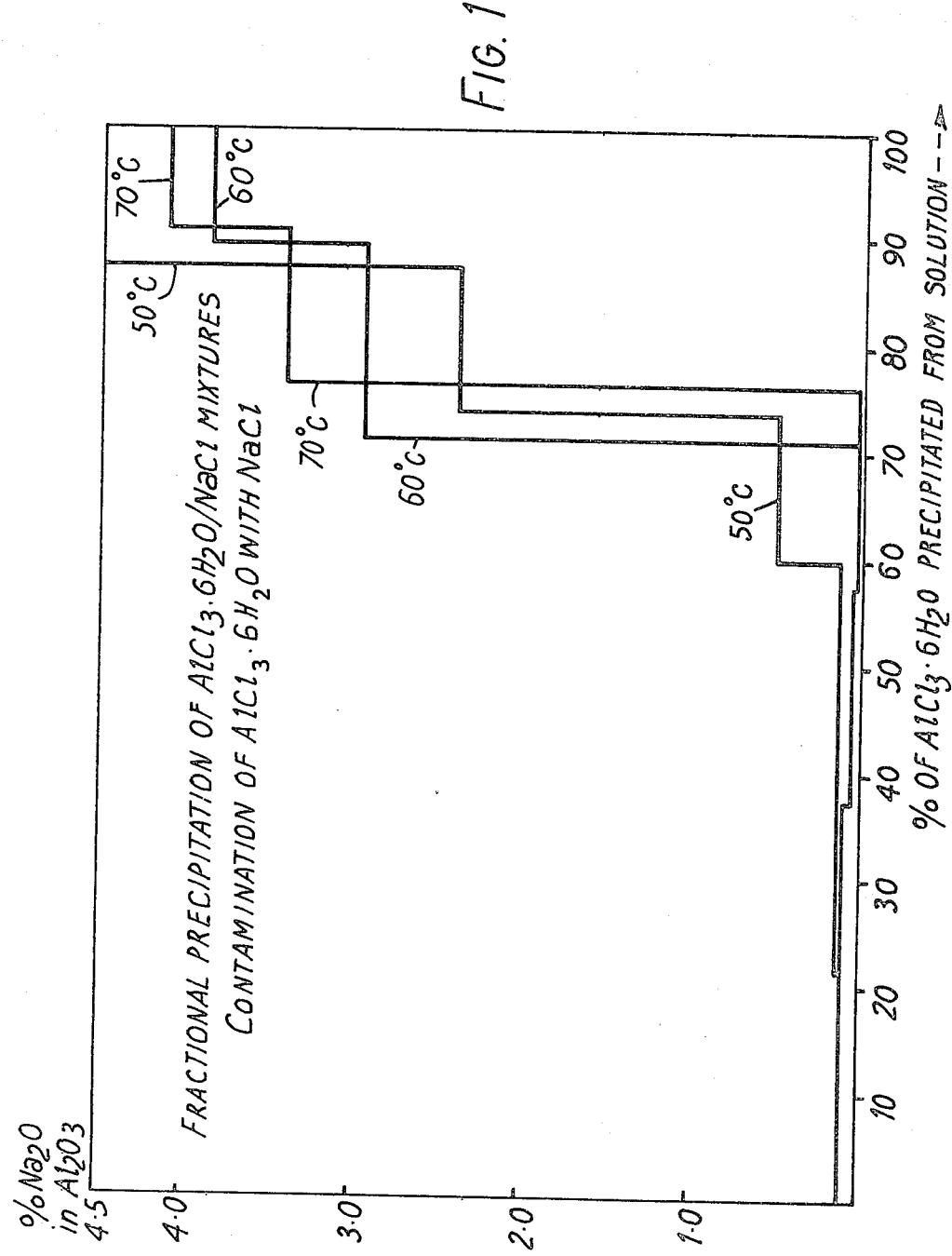

United States Patent [19]

Deutschman et al.

[11] Patent Number: 4,472,361
[45] Date of Patent: Sep. 18, 1984

[54] METHOD OF RECOVERING ALUMINA VALUES FROM A STARTING SOLID MIXTURE COMPRISING ALCL₃ AND NACL

[75] Inventors: John E. Deutschman; Françoise Tahiani, both of Kingston, Canada

[73] Assignee: Alcan International Limited, Montreal, Canada

[21] Appl. No.: 380,024

[22] Filed: May 19, 1982

[30] Foreign Application Priority Data

May 28, 1981 [GB] United Kingdom ............... 8116318

[51] Int. Cl.³ .................... C01F 1/00; C01F 7/56; C01F 7/62; C22B 21/00
[52] U.S. Cl. .................... 423/122; 423/126; 423/132; 423/481; 23/296
[58] Field of Search ............... 423/122, 126, 132, 481; 23/296

[56] References Cited

U.S. PATENT DOCUMENTS 4,158,042  6/1979  Deutschman .............. 423/132

FOREIGN PATENT DOCUMENTS 197804  3/1978  France .................. 423/132

Primary Examiner—Delbert E. Gantz
Assistant Examiner—Chung K. Pak
Attorney, Agent, or Firm—Cooper, Dunham, Clark, Griffin & Moran

[57] ABSTRACT

A starting solid mixture of $AlCl_3$ and Nacl, which may have been obtained by acid leaching of an aluminiferous mineral and precipitation of the $AlCl_3$ and NaCl, is mixed with water in an amount to form an aqueous solution containing NaCl and $AlCl_3$ in a weight ratio $Na_2O/Al_2O_3$ of about 0.028. This is sparged with HCl to precipitate $AlCl_3$, but the sparging is stopped before a substantial concentration of NaCl starts to come out of solution. The precipitated $AlCl_3$ may be calcined to $Al_2O_3$ and washed to remove any residual NaCl.

7 Claims, 2 Drawing Figures

METHOD OF RECOVERING ALUMINA VALUES FROM A STARTING SOLID MIXTURE COMPRISING ALCL3 AND NACL

Various processes have been put forward for recovering alumina values from aluminiferous minerals by leaching with acid. These result in an acid aqueous solution containing cations of aluminium and of a variety of other metals from which it is desired to separate the aluminium.

One technique for the recovery of alumina values from such solutions is by fractional crystallisation. This is proposed in British patent specification No. 1104088; in French Pat. No. 78.15369; and in U.S. Pat. No. 4264332. This technique is effective to separate aluminium from the majority of contaminating metals, but it is ineffective to remove sodium, which precipitates with the aluminium, particularly if calcium chloride is also present.

Another technique for the recovery of alumina values is to sparge the acid leach solution with HCl. This is proposed in U.S. Pat. Nos. 3652232; 4110399; and 4158042; and by J. A. Eisele et al abstracted in Journal of Metals, December 1979, page 82. This technique also, while effective to separate aluminium from the majority of contaminating metals, is ineffective to remove sodium, which precipitates with the $AlCl_3$, particularly if calcium chloride is also present.

U.S. Pat. No. 3862293 describes a process which involves attacking aluminiferous ore with sulphuric acid, and then precipitating alumina by sparging the filtrate with HCl. The resulting hydrated aluminium chloride is contaminated with sulphuric acid and metallic salt impurities, including 0.6% $Na_2O$, and requires a number of washing stages before being pure enough for calcination to product-grade alumina.

The problem of recovering alumina values from a starting solid mixture comprising $AlCl_3$ and NaCl is of long standing, and has never been satisfactorily solved. The process described in U.S. Pat. No. 4158042 involves the following steps:

(i) The starting solid mixture is mixed with water in an amount chosen to dissolve substantially all the $AlCl_3$ while leaving a proportion of the NaCl undissolved, and separating the solution from the undissolved material. The solution has a composition corresponding to the invariant point of the $NaCl/AlCl_3/H_2O$ phase system, i.e. it contains sodium and alumina values in a weight ratio $Na_2O/Al_2O_3$ of about 0.028.

(ii) This solution of invariant composition is sparged with HCl to precipitate the $AlCl_3$, and also incidentally the NaCl.

(iii) The precipitate is calcined under controlled conditions to convert $AlCl_3$ to $Al_2O_3$. The calcined product is cooled, washed to remove NaCl, dried and re-calcined.

The process is effective to separate NaCl but is somewhat inconvenient. Two calcining steps are involved, one under controlled conditions at around 400° C. In between, the solid is cooled, washed and dried; and $Al_2O_3$ calcined at 400° C. retains water tenaciously.

The present invention is an improvement in the process described in U.S. Pat. No. 4158042, and results from our discovery of a wet method for separating Al from Na which renders the controlled calcination and washing sequence (iii) above unnecessary. However, a calcination and washing sequence may optionally be used according to the present invention and is surprisingly effective in reducing even further the sodium content of the alumina. The present invention provides a method of recovering alumina values from a starting solid mixture comprising $AlCl_3$ and NaCl, comprising the steps of:

(a) mixing the starting mixture with water in an amount chosen to dissolve substantially all the $AlCl_3$ while leaving a proportion of the NaCl undissolved, and separating the solution of composition close to the invariant point of the $NaCl/AlCl_3/H_2O$ phase system from the undissolved material (b) sparging the solution resulting from step (a) with HCl to precipitate the $AlCl_3$, and separating the precipitate from the mother liquor, (c) if desired, calcining the precipitate resulting from step (b) to convert $AlCl_3$ to $Al_2O_3$, and washing the $Al_2O_3$ to remove any residual NaCl, characterized in that, in order to obtain alumina values substantially uncontaminated with NaCl, sparging is continued in step (b) until a substantial proportion of the $AlCl_3$ has been precipitated but is stopped before the weight ratio of sodium to aluminium in the forming precipitate, expressed as $Na_2O/Al_2O_3$, rises to 0.01.

The source of the starting solid mixture is immaterial. Typically, it will have been obtained by acid leaching an aluminiferous mineral and precipitating the $AlCl_3$ and NaCl by crystallisation or by sparging with HCl. This step effectively separates $CaCl_2$, where present, which remains in solution.

Step (a) gives rise to a solid residue of NaCl and an aqueous solution containing about 2.8% of sodium values (expressed as $Na_2O$) by weight on the weight of the aluminium values (expressed as $Al_2O_3$).

This solution is sparged in step (b) with HCl so as to precipitate $AlCl_3$, but the sparging is stopped before a substantial concentration of NaCl starts to come out of solution. We have found, and this is the basis of our invention, that the concentration of NaCl in $AlCl_3$ being precipitated by sparging with HCl peaks surprisingly sharply towards the end of the precipitation process, so that $AlCl_3$ precipitated by this method is surprisingly pure.

Figure 2:
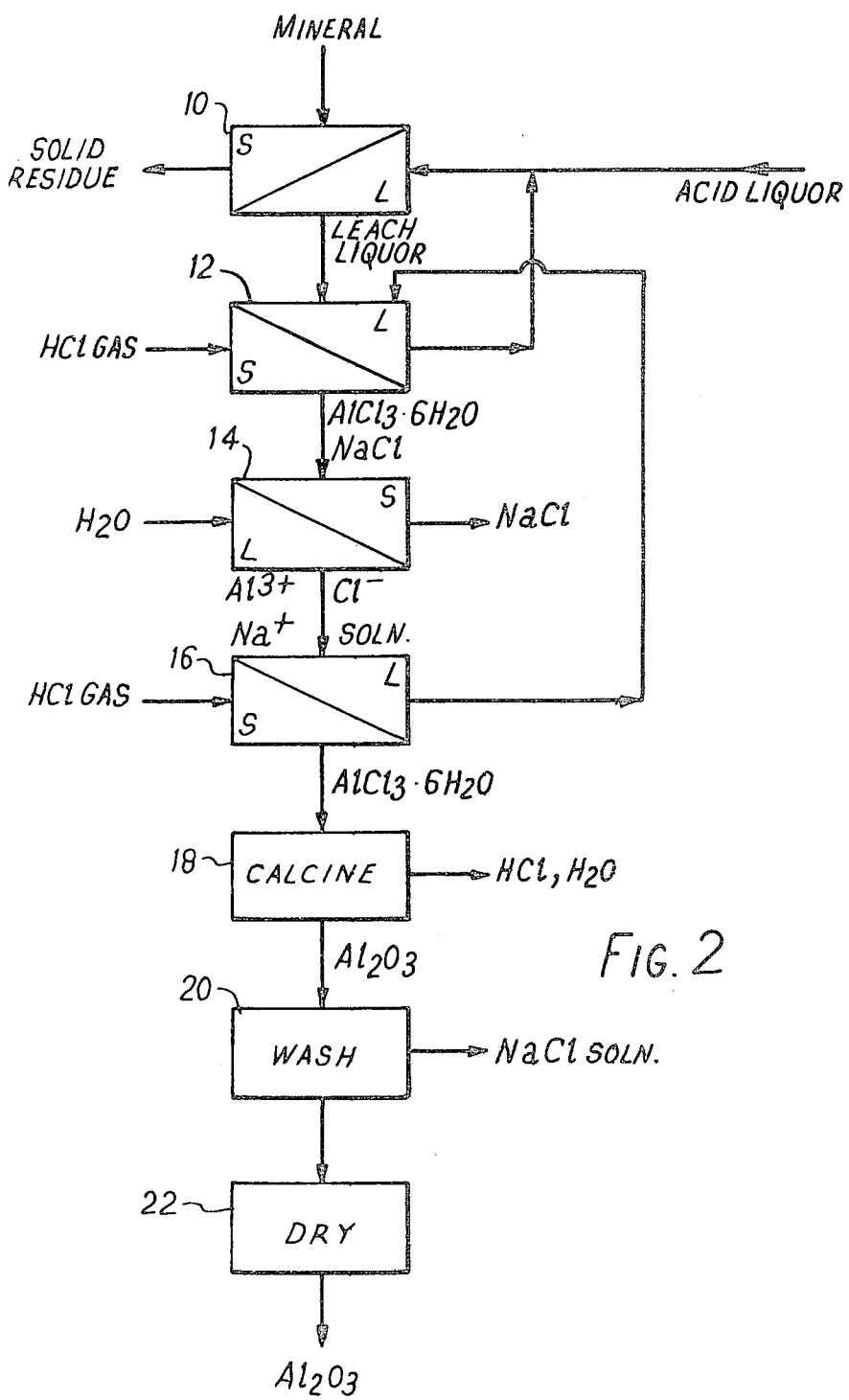

FIGS. 1 and 2 show a precipitation effect of sodium and aluminum chloride and a diagrammatic flow sheet of an alumina recovery process.

FIG. 1 of the accompanying drawings is a diagram showing the fractional precipitation of $AlCl_3.6H_2O/NaCl$ mixtures and the contamination of $AlCl_3.6H_2O$ with NaCl expressed as % $Na_2O$ in $Al_2O_3$. The starting solution contained 2.26 g NaCl and 199 g $AlCl_3.6H_2O$, i.e. a $Na_2O/Al_2O_3$ ratio of 0.028 by weight. The rate of sparging was 350 ml HCl/min and the temperature in three different experiments 50° C., 60° C. and 70° C. In each case the precipitate was removed and analysed at intervals after different percentages of the total available $AlCl_3.6H_2O$ had been precipitated.

As can be seen from the graph at 70° C. the first 77% or so of the precipitated $AlCl_3$ was practically free of sodium contamination. Thereafter the concentration of sodium in the precipitate built up quite abruptly and was 4% by weight (expressed as $Na_2O$ of $Al_2O_3$) at the end of the experiment. Similarly, at 60° C. the first 71% or so of the precipitated $AlCl_3$ was practically free of sodium contamination. While these figures may vary to some extent depending on the conditions of operation, it is believed that under any conditions there is an abrupt build-up of NaCl concentration in the precipitate as precipitation of the AlCl$_3$ nears completion.

According to the present invention, one stops the flow of HCl preferably just before the abrupt build-up of NaCl concentration in the precipitate occurs. It would be possible to stop sparging just after the buildup had occurred, but this would lead to a higher level of contamination of the product AlCl$_3$. At all events one must stop well before all the AlCl$_3$, and incidentally all the NaCl, has been precipitated.

The sparging temperature is not very critical and may conveniently be in the range from ambient to boiling. However, sparging temperatures in the range 40° C. to 90° C., particularly 60° C. to 80° C. are convenient and give excellent results as indicated in FIG. 1, and are preferred.

Preferably, the amount of HCl is chosen to precipitate from 40% to 80% of the AlCl$_3$. The figure of 40% is not critical, but the process is unlikely to be economically viable if less AlCl$_3$ is precipitated. The figure of 80% is quite critical and is dependent to some extent, as indicated above, on the temperature; the rate of sparging, and other conditions.

The supernatant liquid, saturated with HCl and rich in sodium ions, may advantageously be recycled to leach a further supply of aluminiferous mineral. There is no overall build-up of sodium ion concentration, because NaCl is removed in step (a).

It will be recalled that the solution subjected to HCl sparging contained sodium and aluminium in a weight ratio Na$_2$O/Al$_2$O$_3$ of about 0.028. The solid precipitated by sparging contains sodium and aluminium in a weight ratio Na$_2$O/Al$_2$O$_3$ of no more than 0.005, preferably no more than 0.001 and ideally around 0.0006; that is to say the sodium content is reduced by a factor of at least 5.6, preferably of at least 28, ideally of around 47.

The solid can be calcined at the temperatures conventionally used for calcining Al$_2$O$_3$, for example around 1000° C. The calcination acts as a further purifying step, for increased temperature and soak time and the presence of H$_2$O are found favourable for the production of Al$_2$O$_3$ low in Na and Cl. If desired the calcined Al$_2$O$_3$ can be washed with water and dried. It is surprising that the Na content can then be lowered by a further factor of 2 to 5.

Advantages of the method of this invention, compared to the method of U.S. Pat. No. 4158042, are:

1. Most NaCl comes out as solid crystals rather than a difficult to dispose of solution.
2. The heating of Al$_2$O$_3$ to 350°–600° C. and its cooling to the wash temperature are entirely avoided.
3. The cumbersome washing and drying of partly calcined Al$_2$O$_3$ are also eliminated.
4. The cost of recirculating the secondary mother liquor is small.
5. The starting mixture may also contain other unwanted cations, for example Mg, Fe or Ti. The method of the invention, and particularly the partial sparging step (b) is believed effective to separate the aluminium values from the unwanted cations.

FIG. 2 of the accompanying drawings is a diagrammatic flow sheet of a method according to the invention. Referring to FIG. 2, the boxes represent the various steps of the method. Where a box is divided by a diagonal line into halves marked S and L, this means that the step involves separation of the feed into solid and liquid fractions.

In box 10, an aluminiferous mineral is subjected to extraction with an acid liquor giving rise to a leach liquor and a solid residue. The leach liquor passes to a first sparging step in box 12 where HCl gas is used to precipitate all the alumina values, and incidentally also the sodium values, present. The mother liquor is recycled to the extraction step. The precipitate is partly dissolved in box 14 in a limited amount of water, giving rise to a solution containing Al$^{3+}$, Na$^+$ and Cl$^-$ ions and a solid NaCl residue.

The solution is subjected in box 16 to a second sparging step with HCl gas so as to precipitate a major part of the AlCl$_3$, the sparging being stopped before significant quantities of NaCl have precipitated. The mother liquor is recycled via step 12 to the extraction step 10 The AlCl$_3$.6H$_2$O is calcined in box 18 to give Al$_2$O$_3$ which is optionally washed in box 20 and dried in box 22 if an extremely pure Al$_2$O$_3$ is required.

The following example illustrates the invention: A sample of anorthosite was attacked by an HCl leach solution containing CaCl$_2$. The residue was filtered off and the HCl gas was passed through the solution at 50° C. until saturation point. The precipitate, after a wash with saturated HCl, consisted of 199.2 g of AlCl$_3$.6H$_2$O and 7.9 g of NaCl, giving a weight ratio Na$_2$O/Al$_2$O$_3$=0.112.

The mixture of crystals was partly dissolved in 156 ml of water at 20° C. The solids were separated by filtration. They contained 5.6 g NaCl contaminated with 0.63 g of AlCl$_3$.6$_2$O, i.e. the Na$_2$O/Al$_2$O$_3$ ratio was 22.3. The solution contained 198.6 g of AlCl$_3$.6H$_2$O and 2.26 g of NaCl for a Na$_2$O/Al$_2$O$_3$ weight ratio of 0.0285.

The solution was now subjected to HCl sparging at 70° C. until 76% of AlCl$_3$.6H$_2$O precipitated.

This precipitated AlCl$_3$.6H$_2$O contained NaCl in an amount corresponding to a ratio of Na$_2$O/Al$_2$O$_3$=0.00065.

After calcination at 1000° C. for 1 hour (including the heating up time in a muffle furnace), the analysis was Na$_2$O=0.05% and Cl=0.1%.

The calcined Al$_2$O$_3$ was washed with water. It was surprising that the above mentioned product (0.05% Na$_2$O) gave 0.01% Na$_2$O and 0.1% Cl after a water wash and drying at 110° C.

The loss on ignition of the washed Al$_2$O$_3$ was 0.4% which roughly corresponded to the loss on ignition of the original Al$_2$O$_3$. This indicates that the water was completely removed at 110° C.

We claim:

1. A method of recovering alumina values from a starting solid mixture comprising AlCl$_3$ and NaCl, comprising the steps of:
    (a) mixing the starting mixture with water in an amount chosen to dissolve substantially all the AlCl$_3$ while leaving a proportion of the NaCl undissolved, and separating the solution of composition close to the invariant point of the NaCl/AlCl$_3$/H$_2$O phase system from the undissolved material, and
    (b) sparging the solution resulting from step (a) with HCl to precipitate the AlCl$_3$, and separating the precipitate from the mother liquor,
    characterized in that, in order to obtain alumina values substantially uncontaminated with NaCl, sparging is continued in step (b) using only enough HCl to precipitate from 40 to 80% of the AlCl$_3$ present, and is stopped before the weight ratio of sodium to aluminium in the forming precipitate, expressed as $Na_2O/Al_2O_3$, rises to 0.01.

2. A method as claimed in claim 1, wherein the starting solid mixture comprising $AlCl_3$ and NaCl has been obtained by acid leaching an aluminiferous mineral and precipitating the $AlCl_3$ and NaCl by crystallisation or by sparging with HCl.

3. A method as claimed in claim 1, wherein the sparging in step (b) is effected at a temperature of from 40° C. to 90° C.

4. A method as claimed in claim 1, wherein the sparging in step (b) is stopped just before an abrupt build up of NaCl concentration in the precipitate occurs.

5. A method as claimed in claim 2, wherein the mother liquor from step (b) is recycled and used for acid leaching of a further supply of aluminiferous material.

6. A method as claimed in claim 1, wherein the solid precipitated in the sparging step (b) contains sodium and aluminium in a weight ratio $Na_2O/Al_2O_3$ of not more than 0.001.

7. A method as claimed in claim 1, comprising the additional steps of calcining the precipitate resulting from step (b) to convert $AlCl_3$ to $Al_2O_3$, and washing the $Al_2O_3$ to remove any residual NaCl.

* * * * *